No. 733,753. Patented July 14, 1903.

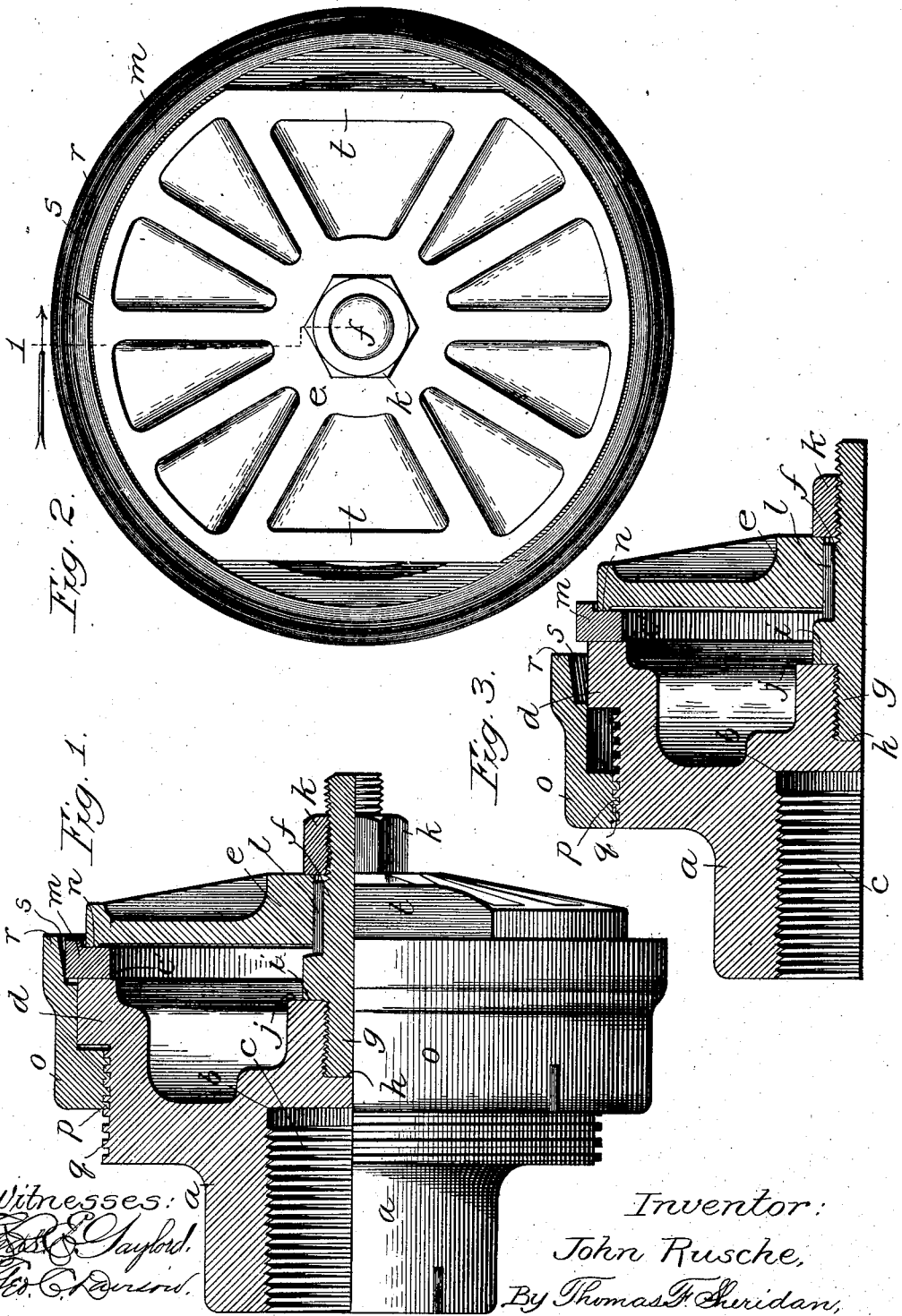

UNITED STATES PATENT OFFICE.

JOHN RUSCHE, OF GRAND CROSSING, WISCONSIN.

CENTERING-CHUCK.

SPECIFICATION forming part of Letters Patent No. 733,753, dated July 14, 1903.

Application filed March 28, 1903. Serial No. 150,009. (No model.)

*To all whom it may concern:*

Be it known that I, JOHN RUSCHE, a citizen of the United States, residing at Grand Crossing, in the county of LaCrosse and State of Wisconsin, am the inventor of certain new and useful Improvements in Centering-Chucks, of which the following is a specification.

My invention relates to that class of chucks having a head, an annular centering-sleeve movably mounted thereon, and a clamping member removably attached to the head and slidable axially with relation thereto.

It relates, further and particularly, to a chuck having a head provided with a clamping shoulder portion, an annular centering-sleeve movable axially thereof, a movable clamping member attached thereto and slidable axially thereof, and means for holding such clamping member in operative position.

The principal object of my invention is to provide a simple, economical, and efficient chuck and centering device.

A further object of my invention is to provide a chuck adapted to hold a piston-ring bushing in position to be properly trued, and provided with means for temporarily loosely holding the piston-ring to be centered in the chuck, and means for clamping it firmly when properly centered.

A further object of the invention is to provide a chuck having an annular centering-sleeve mounted thereon movable axially with relation thereto, for centering a piston-ring or similar device, and provided with a clamping cap member removably attached to the head and movable axially with relation thereto for temporarily holding the piston-ring or similar article loosely while being centered and for holding the same firmly in position when centered and adapted to permit the piston-ring or similar article to be readily removed when turned to the desired proportions.

Other and further objects of the invention will appear from the accompanying drawings and the following description and claims.

The invention consists in the features, combinations, and details of construction hereinafter described and claimed.

In the accompanying drawings, Figure 1 is a view in elevation, partly in section, of a chuck constructed in accordance with my improvements; Fig. 2, an end view thereof; and Fig. 3 a detail sectional view showing the annular centering-thimble withdrawn from engagement with the article to be turned.

In constructing a device in accordance with my improvements I provide a chuck having a head $a$, provided with an axial bore $b$, having threads $c$ and adapted to be mounted in threaded engagement with the driving-spindle or mandrel of a lathe, which latter may be of any ordinary and well-known type. This chuck-head is provided with a preferably annular integral clamping shoulder portion $d$, having a trued surface $c'$, adapted to engage the piston-ring bushing or similar article intended to be turned or trued.

It is well known that considerable difficulty is experienced in present methods and with the present devices for truing piston-rings in quickly and efficiently centering such rings in the chuck, and it is very desirable that means be provided for centering the piston-ring in the chuck while in a compressed condition and enabling it to be turned down and trued while compressed, so that when it is afterward used in a more or less compressed condition its outer surface will retain its cylindrical form corresponding to the cylindrical surface of the piston-cylinder in which it is employed. It is also desirable that the compression of the piston-ring be, so far as practically possible, uniform throughout its entire circumference. In order to accomplish these objects, a clamping cap or plate $e$ is removably attached to the head by being slidably mounted upon a stud $f$, which is mounted in axial alinement with the head by inserting its threaded inner end $g$ into the threaded axial bore $h$ of the head, such stud being provided with an inner shoulder $i$, adapted to engage the adjacent shoulder $j$ of the head, so as to hold such parts firmly in fixed relation to each other and provide the necessary rigidity and strength to withstand the stress and strains to which such parts are subjected in operation. The head and stud may be made of one integral piece, however, without departing from the spirit of my invention. The outer end of this mandrel is provided with screw-threads and with a securing-nut $k$, mounted thereon in threaded engagement with the stud and with its inner shoulder portions in engagement with the clamping-plate.

A portion of the stud inside the protruding threaded end is provided with a smooth cylindrical bearing-surface $l$ of greater diameter than the threaded portion, and the clamping-plate is slidably mounted upon this smooth portion of the stud inside of the threaded portion and nut. By this arrangement it will be readily seen that a piston-ring bushing $m$ or similar article may be placed between the integral clamping shouldered portion of the head and the annular clamping-shoulder $n$ of the clamping-plate and held loosely in such position temporarily, so as to permit such article to be properly centered.

In order to provide means for temporarily centering and compressing the piston-ring or similar article while held loosely between the head and clamping-plate an annular centering-sleeve $o$ is mounted upon the head, so as to move axially with relation thereto. It is provided at one end with inner threads $p$, engaging exterior threads $q$ of the head, and at the opposite end with a projecting centering flange or shoulder portion $r$, having an inner annular surface $s$ of sufficient diameter at the outer edge of the flange to receive the piston-ring when in its normal or expanded condition. The inner diameter of the sleeve gradually diminishes as it recedes from the edge, forming an inclined annular inner surface or centering-flange portion of the sleeve, as shown in Fig. 1, so as to compress the piston-ring uniformly throughout its entire circumference. The centering-sleeve being in threaded engagement with the head is moved forward or backward thereon in sliding engagement with the piston-ring by rotating it in the proper direction. The piston-ring being properly centered and compressed, the clamping-plate is tightened, so as to hold it firmly in position independently of the centering-sleeve, and the centering-sleeve may then be readily removed from engagement with the piston-ring by rotating it in the proper direction until it is entirely out of the way of the cutting-tool, as shown in Fig. 3. The piston-ring having been turned down to the desired dimensions while in its compressed condition may be readily removed by loosening the clamping-plate. It is very desirable, however, that the removal of the ring be rendered possible without entirely removing the securing-plate. In order to accomplish this, I prefer to make the clamping-plate sufficiently narrow at the point $t\ t$ to permit the piston-ring to be removed by passing it over such narrowed portions.

I claim—

1. In a chuck, the combination of a head provided with a clamping shoulder portion, an annular centering-sleeve movably mounted upon such head and provided with a rim extending beyond the clamping shoulder portion of the head, and a clamping-plate slidably mounted adjacent to such head, substantially as described.

2. In a chuck, the combination of a head provided with a clamping shoulder portion, an annular centering-sleeve movably mounted upon such head and provided with an annular flange having an inclined inner surface extending beyond the clamping portion of such head, and a clamping-plate slidably mounted adjacent to such head, substantially as described.

3. In a chuck, the combination of a head provided with a clamping shoulder portion, an annular centering-sleeve mounted in threaded engagement with such head and provided with an annular shoulder having an inclined inner surface extending beyond the clamping shoulder portion of the head, and a clamping-plate slidably mounted adjacent to such head, substantially as described.

4. In a chuck, the combination of a head portion provided with an annular clamping-shoulder, an annular centering-sleeve mounted upon such head in threaded engagement therewith and provided with an annular flange having an inclined inner surface extending beyond the annular shoulder of the head, a stud mounted in alinement with the axial center of the head, and an annular clamping-plate movably mounted upon such stud, substantially as described.

5. In a chuck, the combination of a head provided with a clamping shoulder portion, an annular centering-sleeve mounted in threaded engagement with such head and provided with an annular shoulder having an inclined inner surface extending beyond the clamping shoulder portion of the head, a stud mounted in alinement with the axial center of the head, an annular clamping-plate movably mounted upon such stud and adapted to receive a piston-ring between it and the head portion, and a nut in threaded engagement with the stud and in contact with the clamping-plate for holding such clamping-plate loosely in position to permit the piston-ring to be centered and firmly in position to firmly hold the piston-ring in position to be trued, substantially as described.

JOHN RUSCHE.

Witnesses:
JOHN A. JENSEN,
FRED J. COLTON.